April 7, 1936.   R. C. ZUCKERMAN   2,036,559
METHOD OF AND APPARATUS FOR DISTRIBUTING FERTILIZER
Filed May 16, 1934
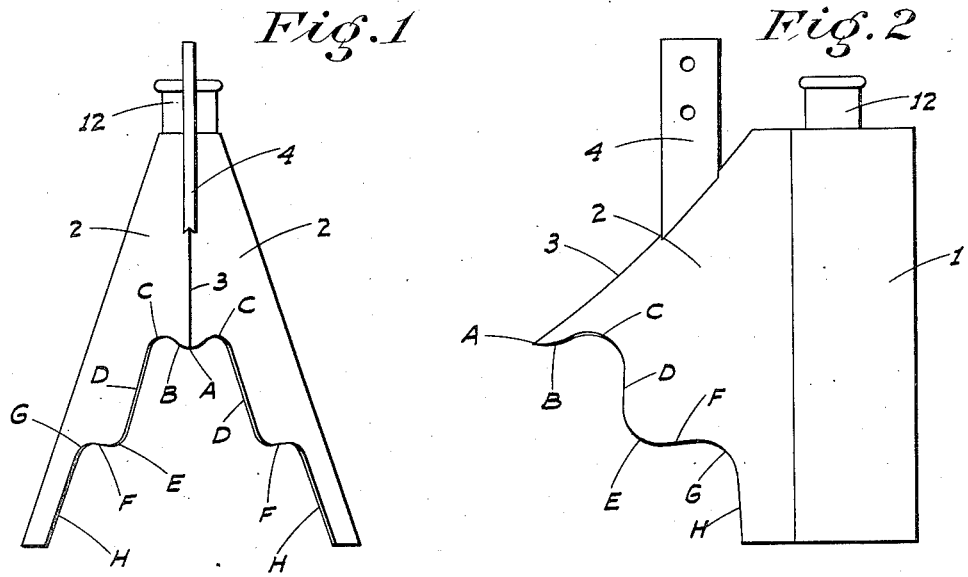
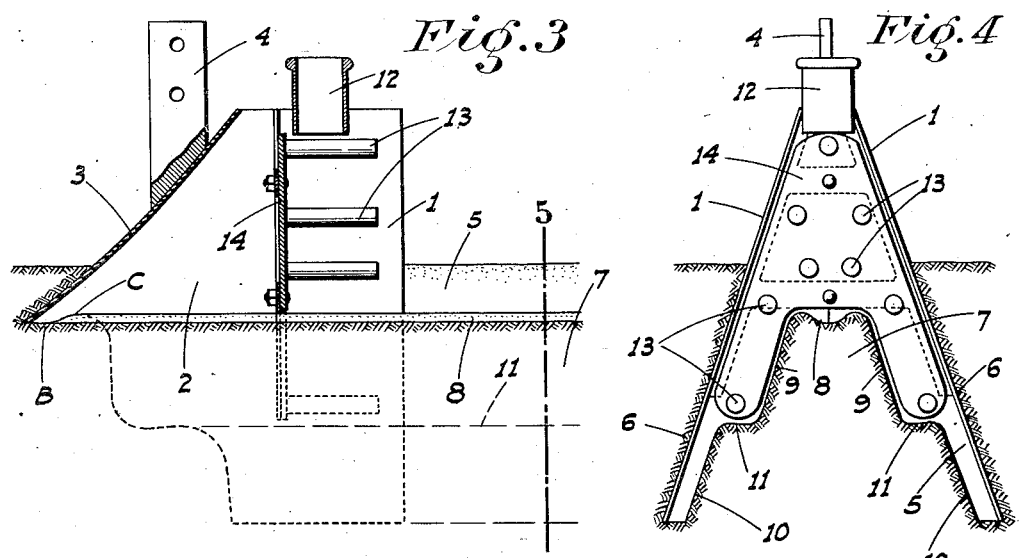
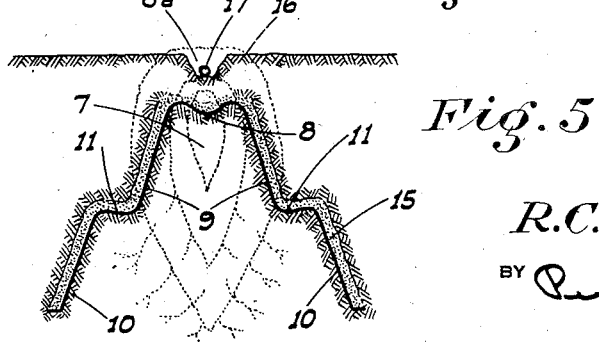
INVENTOR
R.C. Zuckerman
BY
ATTORNEY Patented Apr. 7, 1936

2,036,559

UNITED STATES PATENT OFFICE 2,036,559

METHOD OF AND APPARATUS FOR DISTRIBUTING FERTILIZER

Roscoe C. Zuckerman, Stockton, Calif.

Application May 16, 1934, Serial No. 725,957

12 Claims. (Cl. 111—86)

This invention relates to devices for distributing fertilizer into the ground in controlled quantities and positions, in connection with the preparing of a seed bed and the planting of the seed, and particularly to the fertilizing of seed beds for row crops of tuberous varieties, such as sugar beets.

It is of course desirable that as the tubers start to grow they shall come in contact with the fertilizer in order to promote rapid initial growth. Then as the tuber grows and increases in size both in depth and diameter it sends out small lateral roots and it is also desirous for full and speedy growth of the tuber that such roots shall also come in contact with the fertilizer.

With the ordinary methods of fertilizing it is not possible to attain both the above desired ends. When the fertilizer is placed only immediately below the bottom of the seed receiving furrow, as has been the heretofore common practice, the tuber during its initial growth pushes through the same. Thereafter the tip of the tuber and the side roots lie below and to one side of the deposited fertilizer and therefore obviously cannot receive any appreciable benefit from the fertilizer above, and the growth of the beet is accordingly not stimulated to the degree possible if fertilizer were available as this growth extended.

The principal object of this present invention is to provide a method of forming the seed bed and distributing the fertilizer, and a device for carrying out this method so that the fertilizer will be initially deposited in the ground in position to be beneficial both to the tuber in its first growth and thereafter progressively at all stages of its growth. This requires the initial forming of a furrow of peculiar shape, and a device which is in the form of a combined furrow digging and fertilizing shoe, arranged to thus dig and shape the furrow and to deposit the fertilizer about the furrow in the particular manner as will be hereinafter disclosed.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a front view of my improved distributing shoe.

Figure 2 is a side elevation of the same.

Figure 3 is a sectional elevation of the shoe as depressed in the ground and in operation.

Figure 4 is a rear end view of the shoe as in operation and showing the shape of the furrow as it is initially formed.

Figure 5 is a cross section of the complete furrow after the shoe has passed by, as on the line 5—5 of Figure 3, showing diagrammatically the position of a beet relative to the furrow at various stages in the growth of the beet.

Referring now more particularly to the characters of reference on the drawing, the furrow forming and fertilizer distributing shoe comprises rear side plates 1 which are parallel to each other in the longitudinal plane of the shoe, but are disposed in downwardly diverging relation to each other in a transverse plane. The front plates 2 of the shoe, which are practically extensions of the rear plates, not only have this transverse divergence or slope but also converge upwardly toward each other and come together and are joined along a line 3 which extends upwardly and rearwardly to the top of the shoe a short distance in front of the rear plates 1. The front portion of the shoe therefore forms a wedge-shaped nose which may be moved through the earth with a minimum of resistance.

A rigid standard 4 projects upwardly from the nose along the central line or apex 3, which is adapted for connection to a suitable supporting and advancing vehicle, such as that shown in my Patent No. 1,893,512, dated January 10, 1933. This vehicle contains a supply of fertilizer and is attached to a seeding machine disposed in trailing relation thereto, as shown in said patent.

The lower end of the line 3, and the bottom edge of the nose at the front is disposed at a point A which is on a level substantially midway between the top and bottom of the plates 1. From said point to their rear termination the bottom edges of the plates 2 are cut to a peculiar shape to give the desired shape to the furrow dug by the shoe. Each such edge is cut as follows:

Beginning at the point A the edge is formed with a short convex curve B followed by a concave curve C, which extends to a level somewhat higher than the point A. This curve C merges into a substantially vertical straight portion D which is located approximately one-third the distance between the point A and the further edge of the plates 1. The portion D merges into a convex curve E which in turn merges into a substantially horizontal and relatively short portion F, this portion being on a level substantially midway between the point A and the bottom edge of the rear plates 1. The portion F merges into a concave curve G which in turn merges into a substantially vertical portion H. This latter portion is disposed a short distance ahead of the front edge of the plates 1 and extends to a bottom termination level with the lower edge of said plates 1.

Due to the horizontal rearward and transversely vertical divergence of the nose plates 2 it will be seen that the curves C are disposed laterally relative to the point A, the straight portions D diverge downwardly in a transverse plane, the straight portions F diverge rearwardly in a horizontal plane, while the straight portions H diverge downwardly in a transverse plane and are located further apart than the portions D but closer together than the rear plates 1. This relative arrangement is clearly shown in Figure 1. The curves E and G could possibly be replaced by sharp angular corners but the curves tend to prevent collapse or crumbling away of the dirt as it is engaged and formed by said edges of the full plates.

By means of this construction and form of the shoe it will be seen that if the shoe is depressed in the ground so that the ground level is some distance above the point A of the nose, and is advanced while thus depressed, a furrow 5 will be dug whose side walls 6 are formed by and follow the contour of the rear plates 1, so that said walls have a diverging slope to the bottom. Between the side walls of the furrow an upstanding ridge 7 is formed therein. The bottom of the ridge is level with the bottom of the furrow while its top is formed and shaped by the edge portions B and C of the shoe nose, so that a shallow trough or furrow 8 is provided. The upper side edges 9 of the ridge are formed and shaped by the edge portions D of the shoe plates and consequently have a downwardly diverging slope. The base portions 10 of the sides of the ridge are formed and shaped by the edge portions H of the shoe and between the adjacent ends of the edges 9 and 10 the ridge has substantially flat ledges or shoulders 11 which are formed by the edge portions F of the shoe plates.

The purpose of forming a ridge of this particular shape is to enable a fertilizer to be deposited in the ground at different levels and in certain positions relative to the growing beet and the fertilizer is thus deposited in the following manner:

Secured on and upstanding from the shoe between the plates 1 is a fertilizing intake conduit 12 adapted to be connected to the fertilizer hopper on the machine to which the shoe is attached so that the fertilizer will be delivered downwardly into the space between the plates 1 where the ridge is now completely formed. The fertilizer thus dropping from the conduit is spread laterally in said space by means of distributing pins 13 which project rearwardly from a transverse supporting plate 14. This plate is rigidly mounted in the shoe at the front of the plate 1 and besides providing a support for the pins also acts as a brace to prevent possible inward collapse of the plates 1 and 2. Said plate 14, besides extending substantially the full width and height of the plates 1 from the top of the same to the top of the ridge, also extends downwardly between said plates and the upper side portions of the ridge or about to the ledges 11. This arrangement, which is clearly shown in Figure 3, enables one of the distributing pins being placed near and directly above each ledge so as to cause some of the fertilizer which would otherwise be all deposited on the ledges, to be diverted downwardly and onto the lower side edge portions 10 of the ridge.

By means of this arrangement therefore it will be seen that the fertilizer is distributed over the entire surface area of the ridge in substantially diverging layers as indicated at 15 in Figure 5, and different portions of such fertilizer are thus positioned to be of benefit to the growing beet, indicated at 16, at various stages of its growth. Owing to the shape of the rear portion of the shoe and to the consequently downwardly diverging form of the furrow walls, said walls, from the top to the bottom of the ridge, collapse inwardly as soon as the retaining influence of the plates 1 is removed, so that the majority of the fertilizer is immediately sealed in place, as indicated in Figure 5, and is not thereafter disturbed.

The fertilizer having been thus distributed in the manner disclosed the same is covered with earth in a similar manner to that disclosed in my previous patent as above identified. The seeder shoe then cuts the seed furrow 8a into which is deposited the seed 17 which is then covered with earth in the usual manner. As the seed germinates the small growing tuber first feeds from the fertilizer immediately below it in the trough 8. Then as the tuber grows in length and diameter and sends out its side roots these will progressively contact the fertilizer deposited in the manner disclosed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. The method of preparing a seed bed including digging a relatively deep furrow while leaving an upstanding steep-sided ridge along the same between its sides, and depositing fertilizer over the top and down the sides of the ridge.

2. The method of preparing a seed bed including digging a furrow while leaving an upstanding steep-sided ridge along the same between its sides, shaping the top of the ridge so that it forms a relatively narrow shallow fertilizer retaining furrow below the ground level, and depositing fertilizer into said shallow furrow and down the sides of the ridge.

3. The method of preparing a seed bed including digging a furrow while leaving an upstanding ridge along the same between its sides, shaping the top of the ridge so that it forms a relatively narrow shallow furrow below the ground level, depositing fertilizer into said shallow furrow and down the sides of the ridge, then covering the fertilizer in place with dirt and then planting the seed above the fertilizer.

4. That method of preparing a seed bed comprising the steps of forming temporary continuous and downwardly diverging cuts in the ground below the seed planting level, depositing fertilizer in said openings for substantially the full height thereof, covering the same with earth and planting the seed above the covered fertilizer.

5. That method of preparing a seed bed comprising the steps of providing downwardly diverging layers of fertilizer in the earth below the seed planting level and then planting the seed above the fertilizer substantially along the median line of such diverging layers of fertilizer.

6. A furrow digging and fertilizer distributing shoe comprising rear side plates parallel to each other in the longitudinal plane of the shoe and determining the width and depth of a main furrow, front side plates converging symmetrically forward to a junction with each other from the forward edges of said rear plates, the under edges of the forward plates terminating at their forward conjoined end above the level of the bottom of the rear plates whereby the center of the furrow at that point will only be dug to a corresponding depth and said edges being cut to extend gradually down from said forward end to a rearward termination ahead of the rear plates but on a level with the bottom of the same whereby to cut the dirt downwardly on opposite sides of said center of the furrow to form the downwardly diverging sides of a central ridge upstanding from the bottom of the main furrow in spaced relation to the sides thereof, and a fertilizer conduit mounted on the shoe and depending into the space between the rear plates.

7. A structure as in claim 6, in which said rear plates are disposed with an upward converging slant whereby the side walls of the main furrow will have a similar slant, and will collapse inwardly against the ridge after the said plates move away from said side walls.

8. The method as in claim 1, including the step of forming substantially horizontal ledges on the sides of the ridge intermediate the top and bottom thereof.

9. An agricultural implement including means to form a steep sided earth ridge, means supporting said first named means so that the ridge as formed will extend horizontally and entirely below the surface of the ground, means to form a shallow furrow-like depression along the top of the ridge and means cooperating with said first named means and functioning immediately upon the formation of the ridge and furrow to distribute fertilizer into the furrow and over the top and down the sides of the ridge.

10. An agricultural implement including means to dig a relatively deep steep sided furrow and at the same time leave an upstanding ridge of dirt in the furrow spaced from the adjacent sides of the furrow to form relatively narrow substantially parallel sided cuts, means supporting said first named means in ground engaging position, and means cooperating with said first named means to distribute fertilizer into said cuts for substantially the full height thereof.

11. An agricultural implement including means arranged to dig a relatively steep sided furrow having downwardly diverging sides whereby they tend to collapse inwardly, and to also leave an upstanding ridge of dirt in the furrow spaced from the sides thereof, means supporting said first named means in ground engaging relation, means to distribute fertilizer into the spaces between the furrow and ridge, and means cooperating with said first named means to retain the sides of the furrow against collapse until after the distribution of the fertilizer.

12. An agricultural implement including means to form a steep sided earth ridge, means supporting said first named means so that the ridge as formed will extend horizontally and entirely below the surface of the ground, means cooperating with said first named means to distribute fertilizer over the top and down the sides of the ridge and other means incorporated with said first named means to break the straight continuity of the sides of the ridge by forming substantially horizontal ledges therein intermediate the top and bottom of the ridge.

ROSCOE C. ZUCKERMAN.